United States Patent [19]

Kersten et al.

[11] Patent Number: 4,683,786
[45] Date of Patent: Aug. 4, 1987

[54] NUMERICALLY CONTROLLED LATHE

[75] Inventors: Günther Kersten, Hochdorf; Walter Klauss, Adelberg; Jürgen Michl, Notzingen, all of Fed. Rep. of Germany

[73] Assignee: Traub AG, Fed. Rep. of Germany

[21] Appl. No.: 851,455

[22] Filed: Apr. 14, 1986

[30] Foreign Application Priority Data

May 24, 1985 [DE] Fed. Rep. of Germany ....... 3518792

[51] Int. Cl.$^4$ .............................................. B23B 3/30
[52] U.S. Cl. .......................................... 82/2 B; 82/3; 82/21 R; 82/21 B; 318/98; 318/625; 364/474
[58] Field of Search ................. 82/2 R, 2 B, 3, 21 R, 82/21 B; 318/98, 625; 364/474

[56] References Cited

U.S. PATENT DOCUMENTS

| 3,783,719 | 1/1974 | Gugliotta | 82/21 B |
| 3,818,301 | 6/1974 | Sindelar | 318/625 |
| 4,257,103 | 3/1981 | Suzuki et al. | 364/474 |
| 4,348,623 | 9/1982 | Kobayashi et al. | 364/474 |
| 4,433,383 | 2/1984 | Maurer | 364/474 |
| 4,497,028 | 1/1985 | Nozawa et al. | 364/474 |
| 4,514,814 | 4/1985 | Evans | 364/474 |
| 4,584,638 | 4/1986 | Akasofu | 364/474 |
| 4,612,832 | 9/1986 | Ushigoe et al. | 82/3 |

FOREIGN PATENT DOCUMENTS

| 2702525 | 7/1977 | Fed. Rep. of Germany | 364/474 |
| 3320940 | 12/1984 | Fed. Rep. of Germany | |

Primary Examiner—Nicholas P. Godici
Assistant Examiner—Jerry Kearns
Attorney, Agent, or Firm—Webb, Burden, Robinson & Webb

[57] ABSTRACT

A numerically controlled turning machine comprises a main spindle ($H_s$) and at least two cross slides ($K_1, K_2$) each provided with a saddle ($W_1$ and $W_2$, respectively). Another saddle ($W_3$) is provided at the main spindle end. The cross slide ($K_1$) is provided in addition with a driven tail spindle ($G_s$). The control of the machine is subdivided into a first control system which includes X-axis and Z-axis controls as well as C-axis control with positional adjustment and a second control system which does not have any C-axis control but does include X-axis and Z-axis controls.

10 Claims, 2 Drawing Figures

NUMERICALLY CONTROLLED LATHE

The invention relates to a numerically controlled lathe, comprising a main spindle opposite of which there are at least two cross slides of which the first one is provided with the driven tail spindle and the second one includes a saddle, further comprising another saddle at the main spindle end, and a control system including X-axis control, Z-axis control, and C-axis control with positional adjustment.

Such a lathe is known from DE-OS No. 33 20 940. In that case two individually driven main lathe spindles are supported diagonally opposite in their respective own headstock and each spindle has a saddle of its own associated with it. This arrangement permits working from both ends, especially if the workpieces are bar material, and the non-operative time is short.

Apart from such double spindle machines there are the so-called double slide machines comprising two cross slides each furnished with their own saddle so that a workpiece ma be subjected to simultaneous working by two tools.

It is an object of the invention to provide a numerically controlled lathe which offers a maximum of processing possibilities while disposing of simple means. In particular, the turning machine is to be adapted for switchover from a double slide mode to a double spindle mode at minor expenditure for circuitry.

This object is met, in accordance with the invention, in that the C-axis control including positional adjustment contained in the control system may be utilized both for the main spindle as well as the tail spindle. This means that rather all-round processing steps may be carried out with both spindles without requiring two C-axis controls including positional adjustments (as for nomenclature, particularly of the C axis, we refer to German industrial standard DIN 66217).

In a preferred modification of the invention it is provided that the first cross slide acts not only on a tail spindle but selectively also on a saddle. Thus the same lathe may be used in a double spindle mode as well as a double slide mode, and switchover between the two modes of operation may be effected in the course of working on a workpiece.

Very inexpensive control of the turning machine in spite of diversified processing possibilities is obtained with a modification of the invention in that a second control system likewise comprising at least X-axis and Z-axis control is provided in addition to the first one. Both control systems may be switched over and connected selectively to the main and tail spindles or the saddles, respectively, so that in the "double slide" mode the main spindle is controllable in rotational speed, adjustable in position, and adapted to be synchronized as to its angle with at least one of the saddles by means of the first control system, the X axis and the Z axis of one saddle being controllable by means of the X-axis and Z-axis controls, respectively, of the one control system and the X axis and the Z axis of the other saddle of the double slide mode being controllable by the X-axis and Z-axis controls, respectively, of the other control system. If the lathe is switched over to the "double spindle mode" in the course of processing a workpiece, the tail spindle is controllable as to its rotational speed, adjustable in position, and adapted to be synchronized as to its angle with the other saddle by means of the first control system, the main spindle being controllable at least as to its rotational speed by one of the control systems, and the X and Z axes of the second saddle associated with the main spindle in the double spindle mode being controllable by the other control system.

The control in accordance with the invention permits an operating and synchronizing relationship with the main spindle to be held by the two cross slides and their saddles positioned opposite the main spindle in the "double slide" mode. The control may be switched over, while work is being done on a workpiece, so that one of the cross slides will be in operating and synchronizing relationship with the main spindle, whereas the other cross slide will be in operating and synchronizing relationship with the tail spindle, thereby forming two separate work systems (double spindle operating mode).

The lathe according to the invention thus may be used to subject different parts of a workpiece simultaneously to similar operations. And the driven tools are controllable as to their rotational speeds by numerical commands. Specifically, the driven tools of the saddles may be controlled in angular synchronism at an integral or decimal fraction ratio with respect to the main spindle by numerical control commands.

During work on a workpiece the angular synchronization between the main spindle and one of the driven tools may be given up. Instead, the driven tools of the second and further saddles may be controlled in angular synchronism at an integral or decimal fraction ratio for the driven workpiece reception in the tail spindle. In the double spindle mode both the main spindle as well as the tail spindle may be synchronized with the associated tool The invention will be described further, by way of example, with reference to the accompanying drawings, in which.

Figure 1:
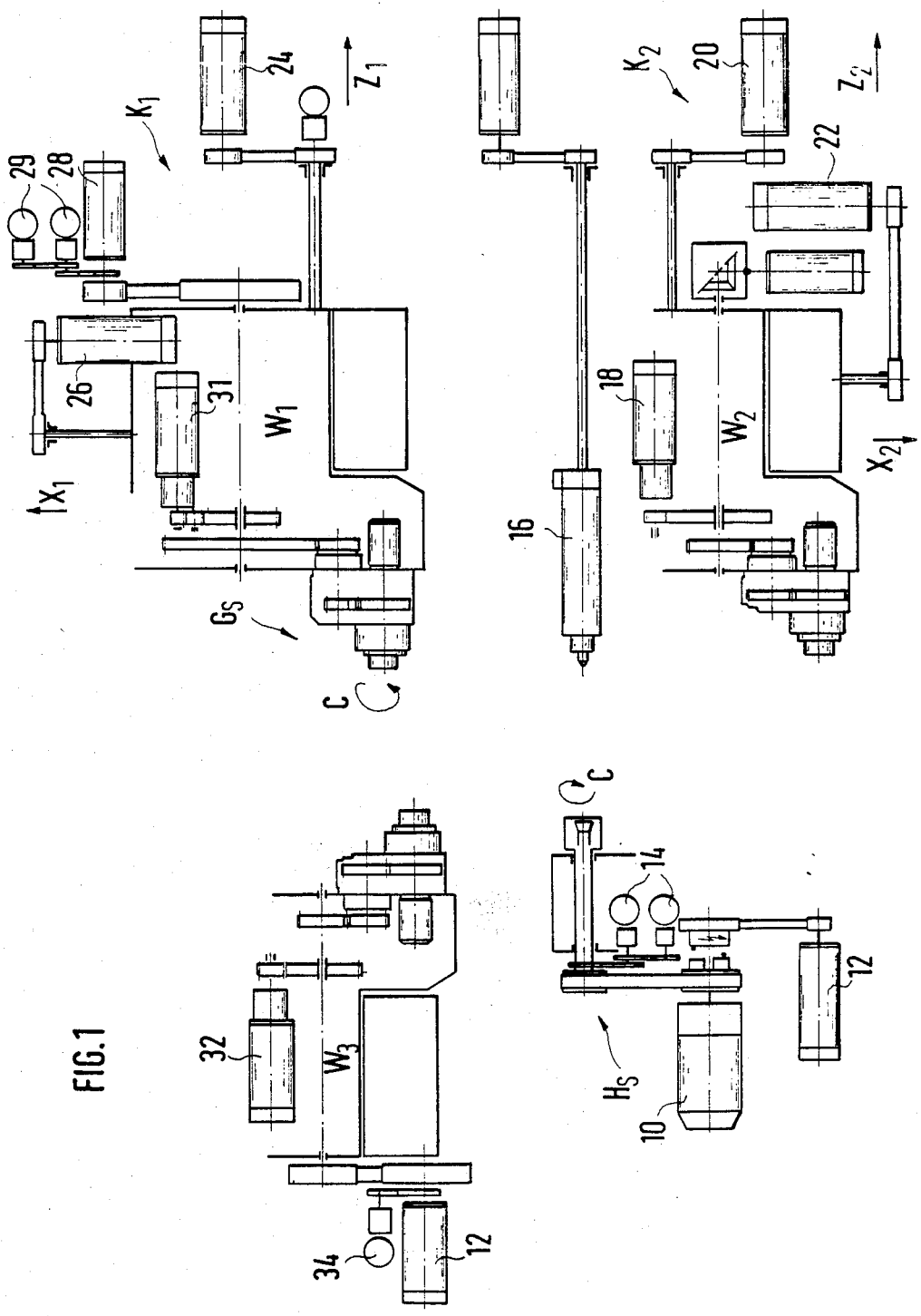
FIG. 1 is a diagrammatic presentation of a lathe according to the invention.

FIG. 1 shows a main spindle $H_s$ on which a motor 10 acts. A servo motor 12 serves for adjustment of the position of the main spindle. Pick-ups 14 determine the position or angle of the main spindle $H_s$. The so-called C axis is shown in the drawing with its sense of rotation marked.

Opposite the main spindle and next to a tailstock 16 there is a second cross slide $K_2$, including the usual longitudinal and transverse slides which are movable according to the coordinates $X_2$ and $Z_2$. A turret indexing drive 18 acts on the saddle $W_2$ which belongs to the cross slide $K_2$. The drives in respect of the Z and X axes are marked by reference numerals 20 and 22.

Another cross slide $K_1$ including a saddle $W_1$ and a tail spindle $G_s$ is positioned diagonally opposite the main spindle $H_s$. The C axis of the tail spindle $G_s$ is likewise shown in the drawing. The cross slide $K_1$ also comprises drives 24, 26 relating to the Z and X axes, respectively. A servo motor 28 and associated pick-ups 29 cooperate with the saddle $W_1$ which likewise comprises a turret indexing drive 31.

The tail spindle $G_s$ is controllable as to its rotary speed, its position along the Z axis is adjustable, and it can also be controlled in angular synchronism with the coordinated saddle $W_3$ (in the double spindle mode).

Opposite the tail spindle $G_s$ at the main spindle end there is the further saddle $W_3$ which likewise is provided with a servo motor 12 as well as a turret indexing drive 32 and a pick-up 34. The saddle $W_3$ is controllable as to its speed of rotation and in angular synchronism.

Figure 2:
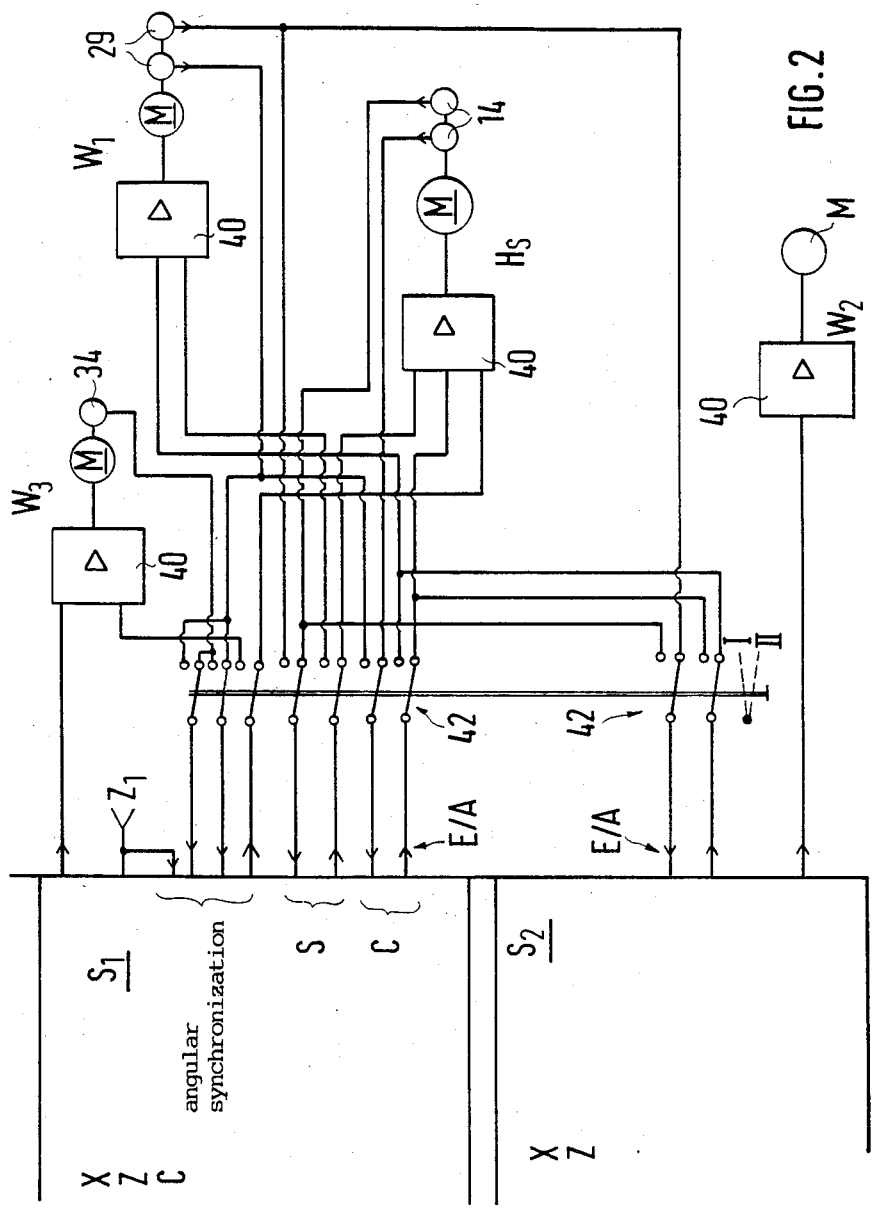
FIG. 2 is a basic circuit diagram of a control for the lathe presented in FIG. 1.

FIG. 2 is a diagrammatic presentation of the two control systems $S_1$ and $S_2$ for control of the turning machine shown in FIG. 1. The first control system $S_1$ comprises X-axis and Z-axis controls as well as a so-called C-axis control including positional adjustment. In the second control system $S_2$ the C-axis control is left out.

Signal input and output with both control systems $S_1$ and $S_2$ is effected in accordance with the arrows E/A.

The controlled structural members, namely the main spindle $H_s$, the saddle $W_1$ (selectively with the tail spindle), $W_2$ and $W_3$ each comprise local circuits 40 controlled by switches 42 in both control systems $S_1$ and $S_2$. The switches 42 are coupled and movable into two positions. In the lower position II shown in FIG. 2 the lathe is controlled in the double slide mode, whereas it is controlled in the double spindle mode in position I shown in discontinuous lines. The values determined by the pick-ups 14, 29, 34 are entered into the controls.

In the double slide mode illustrated the main spindle $H_s$ is controlled as to its rotational speed, it is adjusted in position (C axis), and angularly synchronized with the saddle $W_1$. The saddle $W_1$, too, with its. driven tool is controlled as to its speed of rotation. The X and Z axes $X_1$ and $Z_1$ of saddle $W_1$ are controlled by the first control system $S_1$, while the corresponding axes $X_2$ and $Z_2$ of saddle $W_2$ are controlled by the second control system $S_2$. Both saddles $W_1$, $W_2$ are adapted to be driven.

In the double spindle mode control system $S_1$ controls the tail spindle $G_s$ mounted in cross slide $K_1$, while control system $S_2$ controls the main spindle $H_s$. Two workpieces may be processed at the same time. To this end the axes $X_1$ and $Z_1$ of the first cross slide $K_1$ are controllable by the first control system $S_1$, and the axes $X_2$, $Z_2$ of the second saddle $W_2$ are controllable by the second control system $S_2$. Control of the axis $X_1$ is effected at a high rotational frequency and low resolution, while the axis $X_2$ shows high resolution at medium rotary frequency.

TABLE I

| Mode Switchover | (2 × 2) double slide operating mode System: | | (2 × 2) double spindle operating mode System: | |
|---|---|---|---|---|
| | $S_1$ | $S_2$ | $S_1$ | $S_2$ |
| spindle | main spindle | main spindle | tail spindle | main spindle |
| rotational feed | $X_1/Z_1$ | $X_2/Z_2$ | $X_1/Z_1$ | $X_2/Z_2$ |
| thread cutting | main spindle | main spindle | tail spindle | main spindle |
| velocity constant | main spindle | main spindle | tail spindle | main spindle |
| C axis | main spindle | — | tail spindle | — |
| driven tools | $W_1/W_2$ | $W_1/W_2$ | $W_3$ | $W_2$ very limited |
| angular synchronization | main spindle $-W_1$ | — | tail spindle $-W_3$ | — |

Not only turning but also boring and milling work may be done with a lathe designed and controlled in the manner described above. The positional adjustment of the C axis of the main spindle $H_s$ may be used for three dimensional milling operations if an operating relationship is established between the X, Y, and C axes.

The tail spindle $G_s$ may be used to take up a finished front side of a workpiece and feed the workpiece to a saddle $W_3$ likewise adapted to be driven, in order to machine the backside.

The diverse possibilities of working regarding the front side of a workpiece may be transferred also to the processing of the backside if the double slide operating mode is given up and changed over to double spindle operation. In the double spindle operation the first control system $S_1$ with its C-axis control including the positional adjustment is functionally related with the tail spindle $G_s$ and the axes $X_1$, $Z_1$ of the corresponding cross slide $K_1$, while the control system $S_2$ acts on the axes $X_2$, $Z_2$ and the main spindle.

In the double spindle mode, for instance, a thread may be cut in a first workpiece A by means of the main spindle $H_s$ and the control system $S_2$. At the same time, a thread may be cut in a workpiece B or in the backside of the workpiece A' already done in part, in the tail spindle $G_s$.

Furthermore, the front side of a workpiece A may be subjected to an extensive three-dimensional milling operation by means of the C axis and, upon switchover of the control, also the backside of the workpiece may be processed in a three-dimensional milling operation although the control contains but one C-axis function.

In view of the fact that all drives have servo properties and are equipped with pick-ups for the number of revolutions and position, the respective driven tool may be controlled in angular synchronism at an integral or decimal fraction ratio. In this respect preferably the dynamically poorer drive is drawn upon to form the guidance magnitude, while the dynamically better drive is predetermined by numerical control commands.

If the driven tool is a hob type milling cutter, a toothing may be formed in the front side of a workpiece by hobbing. If the control subsequently is switched over to the double spindle mode, the tail spindle takes the place of the main spindle and the driven tool in the saddle $W_3$ is controlled in the same manner as before, in response to the tail spindle. Thus teeth may be cut also in the backside of the workpiece although the control means establishing the angular synchronism is available only once.

What is claimed is:

1. A numerically controlled lathe comprising a main spindle, at least two cross slides opposite said main spindle, the first cross slide being provided with a driven tail spindle and a first saddle, the second cross slide being provided with a second saddle, a third cross slide at the main spindle end, and a first control system including X-axis control, Z-axis control, and C-axis control with positional adjustment, the C-axis control for selectively controlling one of said main spindle and said tail spindle, such that a workpiece supported by the main spindle may be machined simultaneously with two tools which are supported by said first and second saddles whereby said C-axis control is applicable to the main spindle and that a workpiece supported by the tail spindle may be machined with a tool supported by the third saddle under control of said first cross slide whereby said C-axis control is applicable to said tail spindle.

2. The lathe as claimed in claim 1 wherein said first, second and third saddles are adapted to be driven, a second control system comprising at least X-axis and Z-axis controls being provided next to the first control system, both control systems being adapted to be switched over and converted selectively with the main and tail spindle as well as the first, second and third saddles in such a manner that in a "double slide operating mode" the main spindle is controllable as to its rotational speed, adjustable in position, and adapted to be synchronized as to its angle with at least one of the saddles by means of the first control system, the X-axis and the Z-axis of the first saddle of the first cross slide being controllable by the X-axis and Z-axis control, respectively, of the first control system, and the X-axis and the Z-axis of the second saddle being controllable by the X-axis and the Z-axis control, respectively, of the second control system and that in a "double spindle operating mode" the tail spindle is controllable as to its rotational speed, adjustable in position, and adapted to be synchronized as to its angle with the third saddle by means of the first control system, the X and Z-axes of the third saddle being controllable by the first control system, the main spindle being controllable as to its rotational speed by the first control system, and the X and Z-axes of the second saddle being controllable by the second control system.

3. The lathe as claimed in claim 2 wherein, in the "double slide operating mode", the X axis and the Z axis of the first saddle are controllable by the X-axis and Z-axis control, respectively, of the first control system and the X axis and the Z axis of the second saddle are controllable by the X-axis and Z-axis control, respectively, of the second control system.

4. The lathe as claimed in cleim 2 or 3 wherein, in the "double spindle operating mode", the third saddle is controllable by the first control system as to its X and Z axes, and the second saddle is controllable by the second control system as to its X and Z axes.

5. The lathe as claimed in claim 2 or 3 wherein, in the "double slide operating mode", the first and second saddles are in operating and synchronizing relationship with the main spindle, and in the "souble spindle operating mode", the second saddle is in operating and synchronizing relationship with the main spindle and the third saddle is in operating and synchronizing relationship with the tail spindle.

6. The lathe as claimed in claim 2 or 3, and including means for driving the tools of the saddles under rotational speed control.

7. The lathe as claimed in claim 4 wherein, in the "double slide operating mode", the first and second saddles are in operating and synchronizing relationship with the main spindle, and in the "double spindle operating mode", the second saddle is in operating and synchronizing relationship with the main spindle and the third saddle is in operating and sychronizing relationship with the tail spindle.

8. The lathe as claimed in claim 4, and including means for driving the tools of the saddles under rotational speed control.

9. The lathe as claimed in claim 5, and including means for driving the tools of the saddles under rotational speed control.

10. The lathe as claimed in claim 7, and including means for driving the tools of the saddles under rotational speed control.

* * * * *

UNITED STATES PATENT AND TRADEMARK OFFICE
CERTIFICATE OF CORRECTION

PATENT NO. : 4,683,786

DATED : August 4, 1987

INVENTOR(S) : Gunther Kersten et al.

It is certified that error appears in the above-identified patent and that said Letters Patent is hereby corrected as shown below:

Column 1 Line 22 "ma be" should read —may be—.

Column 2 Line 33 After "tool" insert —.—.

Column 3 Line 42 Before "TABLE I" insert the phrase —The various modes and functions are listed in table I below.—.

Column 3 Line 66 "Y" should read —Z—.

Claim 4 - Column 5 Line 29 "cleim" should read —claim—.

Claim 5 - Column 6 Line 6 "souble" should read —double—.

Signed and Sealed this

Nineteenth Day of January, 1988

*Attest:*

DONALD J. QUIGG

*Attesting Officer*      *Commissioner of Patents and Trademarks*